(12) United States Patent
Yang

(10) Patent No.: US 11,168,864 B1
(45) Date of Patent: Nov. 9, 2021

(54) LASER ENGRAVED LIGHTING STRUCTURE

(71) Applicant: Tung-Yao Yang, Tainan (TW)

(72) Inventor: Tung-Yao Yang, Tainan (TW)

( * ) Notice: Subject to any disclaimer, the term of this patent is extended or adjusted under 35 U.S.C. 154(b) by 0 days.

(21) Appl. No.: 17/009,734

(22) Filed: Sep. 1, 2020

(51) Int. Cl.
| | |
|---|---|
| *F21V 3/04* | (2018.01) |
| *F21L 4/00* | (2006.01) |
| *F21V 33/00* | (2006.01) |
| *G09F 13/04* | (2006.01) |
| *B23K 26/364* | (2014.01) |
| *B23K 103/00* | (2006.01) |
| *F21Y 115/10* | (2016.01) |

(52) U.S. Cl.
CPC .............. *F21V 3/04* (2013.01); *B23K 26/364* (2015.10); *F21V 33/0004* (2013.01); *G09F 13/04* (2013.01); *B23K 2103/54* (2018.08); *F21Y 2115/10* (2016.08)

(58) Field of Classification Search
CPC ..... F21V 3/04; F21V 33/0004; B23K 26/364; B23K 2103/54; G09F 13/04; F21Y 2115/10
See application file for complete search history.

(56) References Cited

U.S. PATENT DOCUMENTS

| | | | | |
|---|---|---|---|---|
| 6,508,022 | B2 * | 1/2003 | Huang | G09F 19/08 |
| | | | | 40/406 |
| 2014/0268672 | A1 * | 9/2014 | Yang | F21S 10/002 |
| | | | | 362/101 |
| 2014/0268704 | A1 * | 9/2014 | Yang | G09F 13/00 |
| | | | | 362/185 |
| 2014/0268705 | A1 * | 9/2014 | Yang | F21S 9/02 |
| | | | | 362/186 |
| 2014/0268866 | A1 * | 9/2014 | Yang | B65D 39/00 |
| | | | | 362/605 |

FOREIGN PATENT DOCUMENTS

TW        M484674      *  8/2014

OTHER PUBLICATIONS

Yang, WM484674,machine translation, Aug. 2014 (Year: 2014).*

* cited by examiner

*Primary Examiner* — Tracie Y Green
(74) *Attorney, Agent, or Firm* — Leong C. Lei

(57) ABSTRACT

A laser engraving lighting structure includes: a main body, being a light-transmissible three-dimensional shell, an outer surface of the main body having a decorative pattern formed by means of laser engraving; and a base, connected to a bottom of the main body, the base configured with an electronic control unit including at least one light emitting element in electric connection with the electronic control unit, and the light emitting element irradiating toward the main body. Whereby, when the light emitting element is powered on, the light will pass through the main body to project the decorative pattern on the outer surface of the main body onto the surrounding objects or wall surfaces.

6 Claims, 8 Drawing Sheets

LASER ENGRAVED LIGHTING STRUCTURE

TECHNICAL FIELD OF THE INVENTION

The present invention relates to a lighting structure, and more particularly to a lighting structure with a laser engraving pattern.

DESCRIPTION OF THE PRIOR ART

The rapid development of technology, culture, society and other aspects, people are paying more and more attention to the pursuit of quality of life, especially the requirements for the quality of life at home is also an extremely important.

Lighting is used to satisfy basic illumination requirements in daily life, and to make life more tasteful, many people will also place a variety of lighting in homes, offices, commercial spaces, or etc. to add changes in living space.

People will use the change of light color to produce a different visual effect from the past for general lighting in addition to changing the appearance thereof. However, most traditional lamps are limited to static displays and lack visual effects. The visual effects they can bring are easy to be dull and boring due to the passage of time, so there is still room for improvement.

SUMMARY OF THE INVENTION

To overcome the disadvantages mentioned above, the main object of the present invention is to provide a laser engraving lighting structure.

The laser engraving lighting structure of the present invention includes: a main body, being a light-transmissible three-dimensional shell, an outer surface of the main body having a decorative pattern formed by means of laser engraving; and a base, connected to a bottom of the main body, the base configured with an electronic control unit including at least one light emitting element in electric connection with the electronic control unit, and the light emitting element irradiating toward the main body.

Whereby, when the light emitting element is powered on, the light will pass through the main body to project the decorative pattern on the outer surface of the main body onto the surrounding objects or wall surfaces. At the same time, the decorative pattern on the outer surface of the main body will also produce a sense of brightness.

DETAILED DESCRIPTION OF THE PREFERRED EMBODIMENTS

Figure 1:
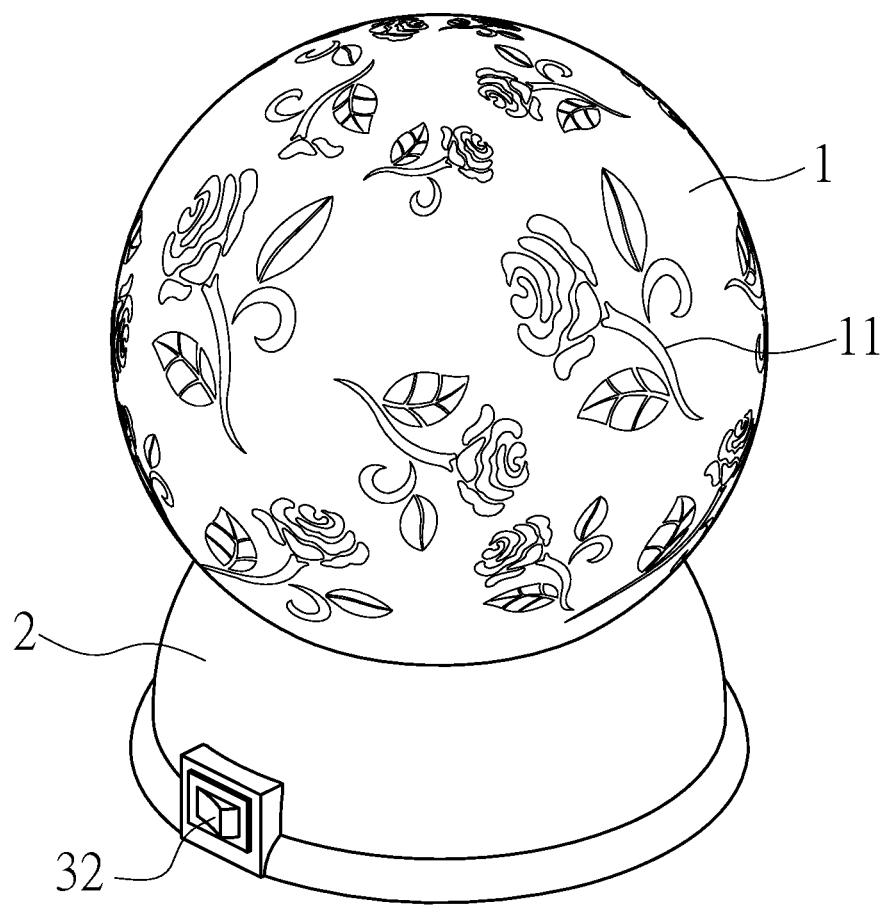
FIG. 1 is a perspective view of the present invention.
Figure 2:
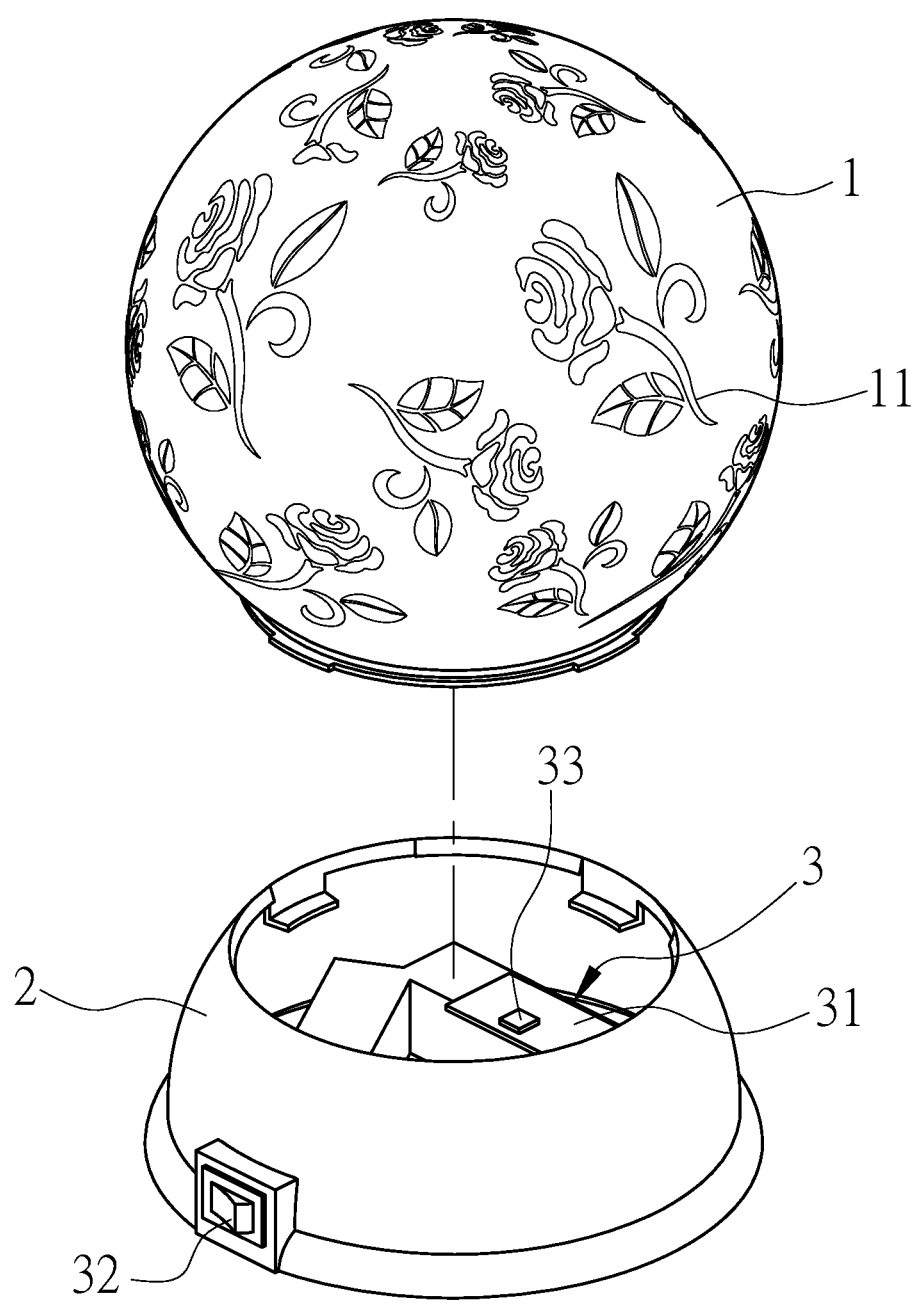
FIG. 2 is an exploded view of the present invention.
Figure 3:
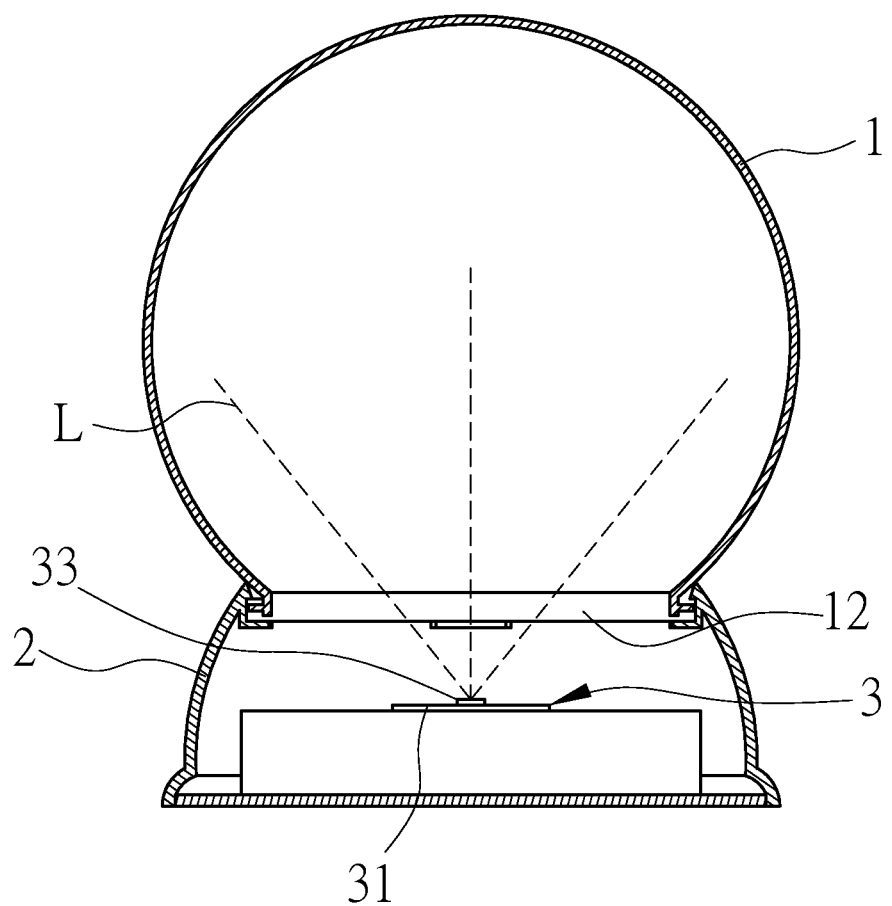
FIG. 3 is a cross-sectional view of the present invention.

Referring to FIGS. 1 to 3, a laser engraving lighting structure of the present invention, in a preferred embodiment, mainly includes a main body 1 and a base 2.

Figure 6:
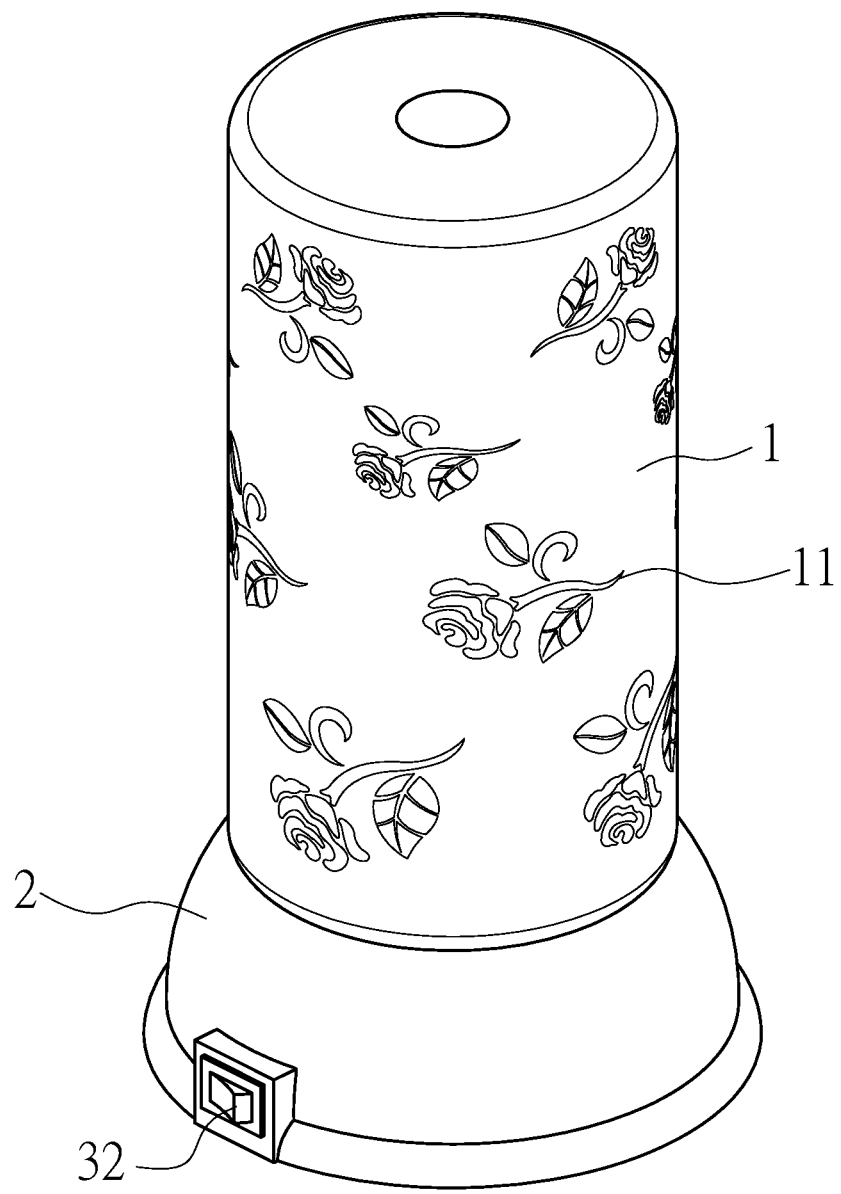
FIG. 6 is a schematic view of the embodiment of the present invention.

The main body 1 is a light-transmissible three-dimensional shell having an appropriate thickness; the above "light-transmissible" means that light can pass through. Therefore, the main body 1 can be transparent or matte. The outer surface of the main body 1 has a decorative pattern 11 formed by laser engraving, and the main body 1 may be a shape extended by a sphere, a cylinder, a cone, a polygonal shape or a geometric shape as the basis and any form of image such as animal, plant or character. In the embodiment, a sphere is taken as an example. In addition, FIG. 6 shows an embodiment in which the main body 1 is a cylinder.

The base 2 is connected to the bottom of the main body 1, and the inside of the base 2 is configured with an electronic control unit 3 including a control circuit board 31, a switch 32 and at least one light emitting element 33, where the light emitting element 33 and the switch 32 are respectively in electric connection with the control circuit board 31, the light emitting element 33 irradiates towards the main body 1, and the power source of the electronic control unit 3 may be mains or battery. Moreover, the present invention is not limited to the light emitting element 33 and may be a light bulb or LED.

Whereby, when the electronic control unit 3 is powered on, the light generated from the light emitting element 33 will pass through the main body 1, and the decorative pattern 11 on the outer surface of the main body 1 is projected onto the surrounding objects or wall surfaces. At the same time, the decorative pattern 11 on the outer surface of the main body 1 will also produce different brightness due to the refraction and reflection of light, thereby effectively improving the visual experience of the overall appearance.

Figure 4:
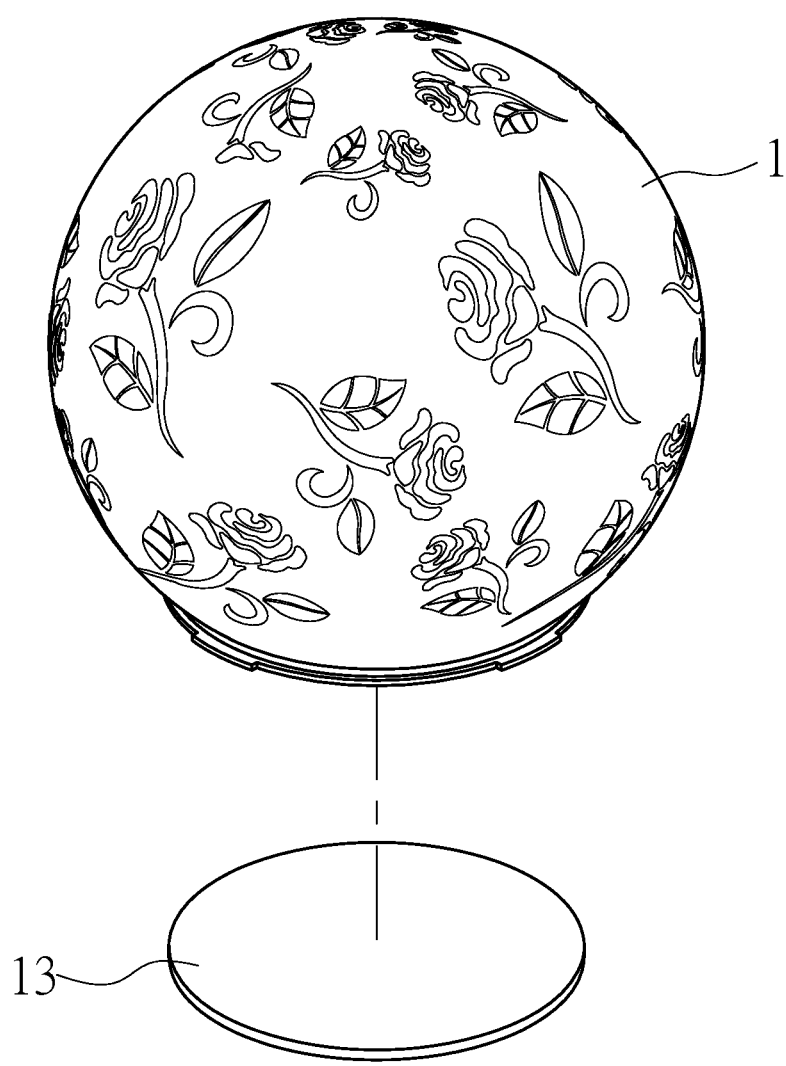
FIG. 4 is am exploded view of a preferred embodiment of a main body of the present invention.
Figure 5:
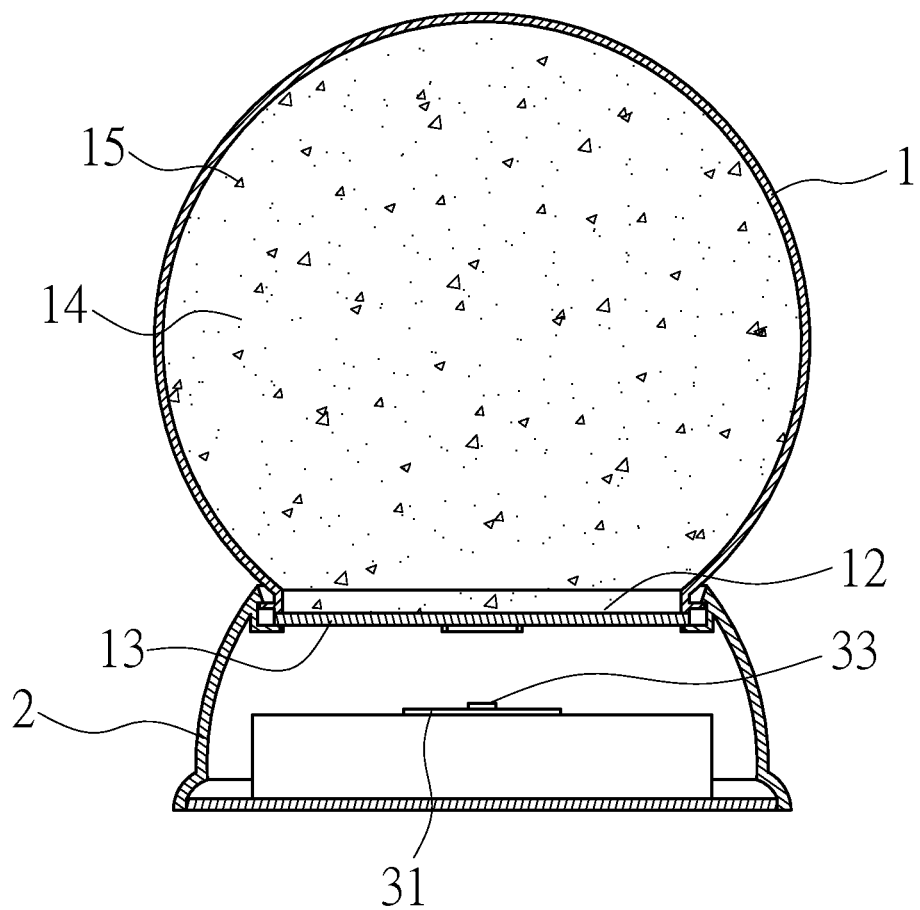
FIG. 5 is a cross-sectional view of FIG. 4.

Next, referring to FIGS. 4 and 5, the bottom of the main body 1, in another preferred embodiment, is configured with an opening 12 facing downward, and further includes a light transmissible bottom cover 13 adapted to cover the opening 12 on the bottom of the main body 1, thereby enclosing a closed space 14 together with the main body 1, and flowable liquid is filled inside the closed space 14, where pigments may be added to the liquid to make it colored liquid, and sequins 15 or bright powder may also be mixed in the liquid. Whereby, the main body 1 can have a brilliant visual effect through light exposure.

Figure 7:
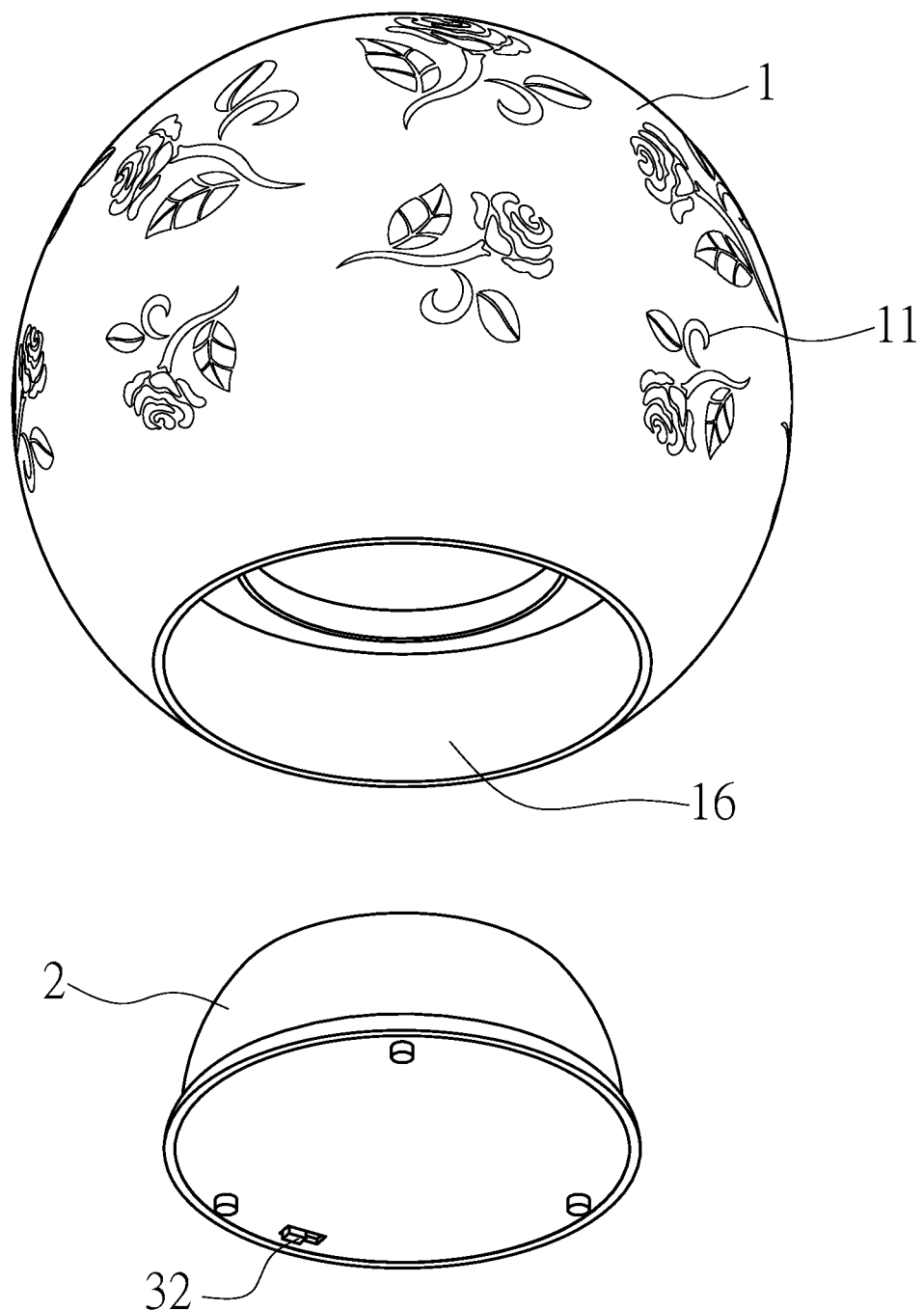
FIG. 7 is an exploded view of the embodiment of the present invention.
Figure 8:
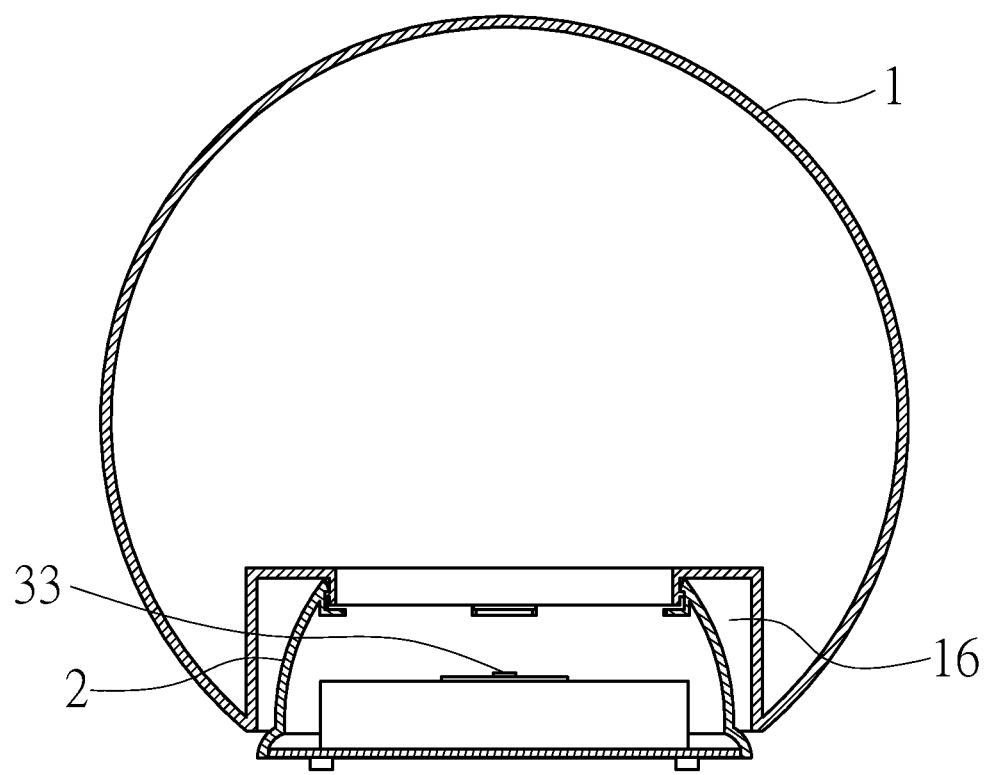
FIG. 8 is a cross-sectional view of FIG. 7.

Finally, referring to FIGS. 7 and 8, the bottom of the main body 1, in this embodiment, is recessed inward with an accommodation groove 16, and the base 2 is configured inside the accommodation groove 16 and connected to the bottom of the main body 1; the present invention does not limit the shape of the accommodation groove 16, which may be circular, square or polygonal; a circular accommodation groove is taken as an example in the figures. After the base 2 is placed in the accommodation groove 16, the base 2 can be completely submerged into the main body 1 or as shown in FIG. 8, partially exposed out of the main body 1 to improve the uniqueness of the product.

I claim:

1. A laser engraved lighting structure, comprising:
a main body, being a light-transmissible three-dimensional shell, an outer surface of said main body having a decorative pattern formed by means of laser engraving; and
a base, connected to a bottom of said main body, said base configured with an electronic control unit comprising at least one light emitting element in electric connection with said electronic control unit, and said light emitting element irradiating toward said main body;
wherein the bottom of said main body is formed with an accommodation groove, the accommodation groove being delimited by a sidewall and separated from an interior space of the main body, wherein said base is disposed in said accommodation groove such that the at least one light emitting element is located in the accommodation groove and light emitting from the at least one light emitting element travels from the accommodation groove into the interior space of the main body.

2. The laser engraved lighting structure according to claim 1, wherein said bottom of said main body is configured with an opening facing downward, and further comprises a light-transmissible bottom cover adapted to close said opening of said main body and encloses a closed space together with said main body, with flowable liquid being filled inside said closed space.

3. The laser engraved lighting structure according to claim 1, wherein said main body is a shape extended by a sphere, a cylinder, a cone, a polygonal shape or a geometric shape as the basis and any form of image.

4. The laser engraved lighting structure according to claim 1, wherein said base is configured with a switch in electric connection with said electronic control unit.

5. The laser engraved lighting structure according to claim 1, wherein said light emitting element is an LED.

6. The laser engraved lighting structure according to claim 2, wherein sequins or bright powders are mixed in the liquid.

* * * * *